United States Patent [19]
Langenberg et al.

[11] Patent Number: 5,055,092
[45] Date of Patent: Oct. 8, 1991

[54] DRIVING SYSTEMS FOR DRIVING ENDLESS CHAINS OR THE LIKE IN MINING APPARATUS

[75] Inventors: Werner Langenberg, Werne; Werner Bohle, Ludinghausen, both of Fed. Rep. of Germany

[73] Assignee: Gewerkschaft Eisenhutte Westfalia GmbH, Fed. Rep. of Germany

[21] Appl. No.: 645,547

[22] Filed: Jan. 24, 1991

[30] Foreign Application Priority Data

Jan. 26, 1990 [DE] Fed. Rep. of Germany ....... 4002303

[51] Int. Cl.$^5$ ............................................. F16H 37/06
[52] U.S. Cl. ........................................... 475/2; 475/5; 475/8; 475/125; 475/264
[58] Field of Search .................... 475/2, 5, 8, 125, 151, 475/152, 263, 264, 265, 318; 198/330, 810

[56] References Cited

U.S. PATENT DOCUMENTS

| | | | |
|---|---|---|---|
| 3,211,262 | 10/1965 | Hoffstrom | 475/263 X |
| 4,514,991 | 5/1985 | Zinsmeyer | 475/2 X |
| 4,586,400 | 5/1986 | Nygren | 475/2 |
| 4,601,218 | 7/1986 | Bohle | 475/125 |
| 4,614,134 | 9/1986 | Bohle | 475/263 X |
| 4,633,735 | 1/1987 | Sakurai et al. | 475/2 |
| 4,939,949 | 7/1990 | Langenberg | 475/5 X |

FOREIGN PATENT DOCUMENTS

| | | | |
|---|---|---|---|
| 366847 | 5/1939 | Italy | 475/5 |
| 2141199 | 12/1984 | United Kingdom | 475/263 |

*Primary Examiner*—Dwight Diehl
*Attorney, Agent, or Firm*—Samuels, Gauthier & Stevens

[57] ABSTRACT

A drive system for driving an endless chain of a mineral mining installation employs one or more chain wheels each driven by an electric motor and gearing including planetary gearing. The planetary gearing has a ring gear which can be held stationary to permit drive to be transmitted. The ring gear is coupled through a clutch, reduction gearing and a braking device to another load-balancing electric motor. Load sensors in the reduction gearing disengage the clutch in the event of overloading. The ring gear is automatically held stationary by the braking device when the load-balancing motor is inoperative. When the motor is switched on the braking device is released to permit the motor to rotate the ring gear in one direction or the other at controlled speed to vary the transmission ratio and effect load balancing.

17 Claims, 3 Drawing Sheets

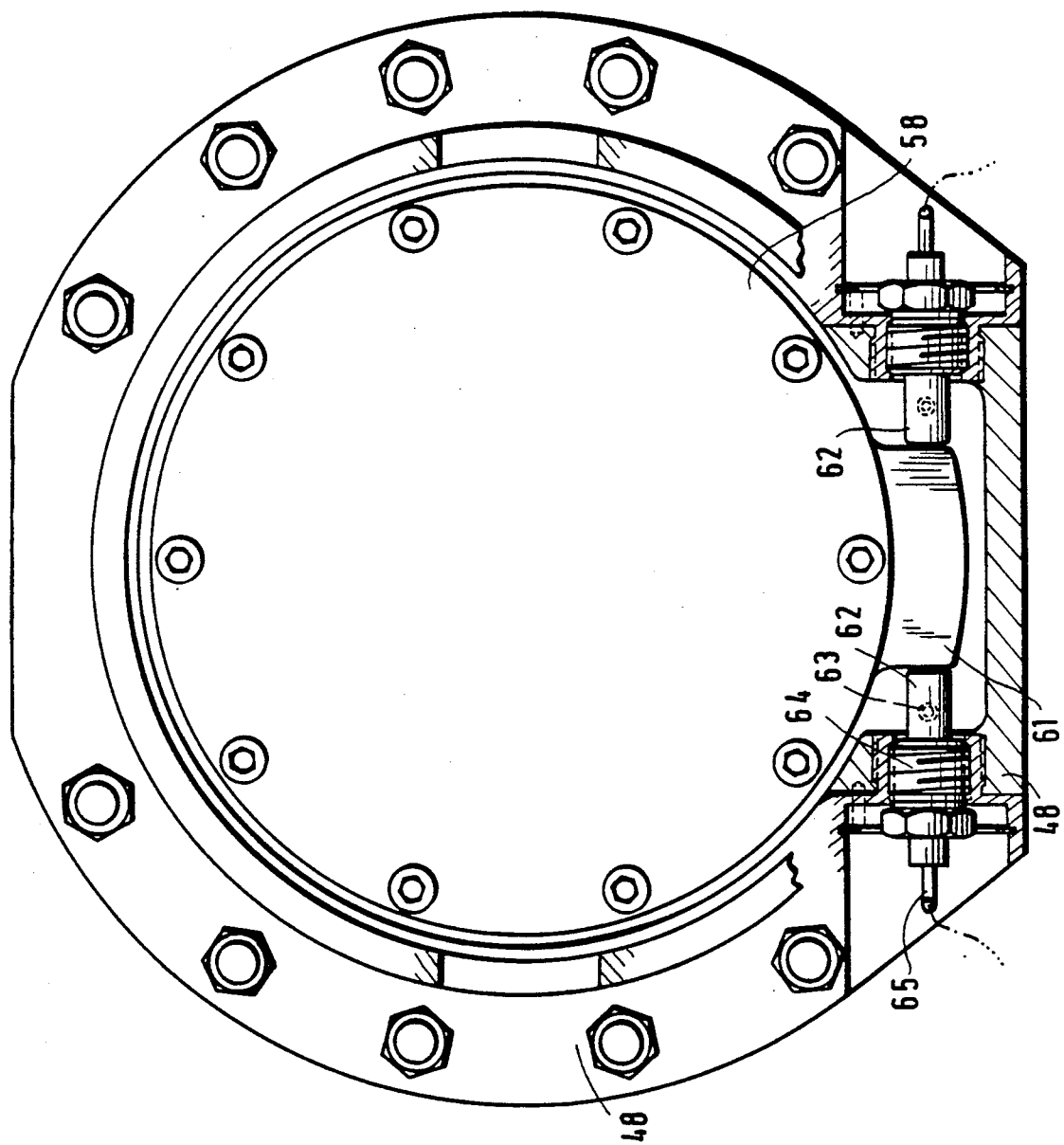

DRIVING SYSTEMS FOR DRIVING ENDLESS CHAINS OR THE LIKE IN MINING APPARATUS

FIELD OF THE INVENTION

The invention relates to drive systems for endless traction members, such as chains or belts, and chain driven apparatus, especially for mineral mining machines, such as coal ploughs, with overload protection and load balancing facilities.

BACKGROUND TO THE INVENTION

Gearings with overload clutches, which in the case of overload separate the gear output from the gear input and thus interrupt drive power, are known from U.S. Pat. Nos. 4,601,218 and 4,614,134. Such overload protected gearings are provided for preference in high-power chain drive systems such as are used above all in mining, primarily in coal plough drive systems and other chain drive systems for mineral winning machines.

The known drive systems are mostly designed as double drive systems with two drive stations, i.e. the so-called main and auxiliary drive stations, at both chain reversal zones. When asynchronous motors are used at the main and auxiliary drive stations unequal load distributions occur because of electrical and mechanical imbalance, with the consequence that the electric power frequently cannot be fully utilised. The motor at the main and auxiliary drive stations are positively synchronised mechanically by means of the common chain they drive. The latter often comprises, seen over its total length, sections with different permanent chain stretches. This leads to power displacements and an irregular load distribution on the main and auxiliary drive motors. Since asynchronous motors react sensitively to variations in rotation, as is known even relatively slight variations can lead to the one of the two motors working only with partial load or even in the extreme case to one of the two motors acting as a generator. In order to achieve the optimum possible exploitation of the available electric drive power, it is known in the stated drive systems to employ a load balancing arrangement in the configuration of superposition gearing. Both the main and auxiliary drive stations may employ such gearing, usually planetary gearing, with load-dependently or rotation-rate dependently regulated motors (see U.S. Pat. No. 4,939,949 and DE-PS 3,742,342).

In the known drive systems with load balancing hydraulic motors are provided in general for operating the gearing which serves for the load balancing, but electric motors have also been proposed in the prior art for this purpose.

It is an object of the invention inter alia to develop a drive system with overload protection and load balancing facilities so that when using an electric motor for balancing it is possible to achieve an improved finely sensitive control and high operational reliability.

SUMMARY OF THE INVENTION

In accordance with the invention an electric motor for effecting load balancing is connected through reduction gearing and in the drive connection between the motor and the gearing used for balancing there is arranged a braking device for locking the drive, with an associated automatic switch system.

A drive system according to the invention may comprise an electric drive motor, gearing connecting the motor to an output for propelling a traction member, said gearing including at least one planetary gearing stage with a rotatable control component drivable to effect load balancing overload protection and load balancing means composed of a clutch drivably connected to the control component of the planetary gearing stage, a second electric motor for driving the control component at controlled speed via the clutch and a control unit for disengaging the clutch in the event of overloading; wherein there is provided reduction gearing interconnecting the second motor and the clutch and a braking device in a drive connection between the second motor and the control component for selectively locking the control component. The planetary gearing may comprise a sun wheel drivably connected to the drive motor, planet wheels meshing with the sun wheel, a carrier rotatably supporting the planet wheels and drivably connected to said output and a toothed ring serving as the control component meshing with the planet wheels.

The reduction gearing allocated to the electric motor used for load balancing reduces the drive-input rotation rate of the motor to such a value that a finely sensitive adaptation of rotation rate and thus a finely sensitive load balancing in the case of the drives coupled through a driven endless chain is possible in the sense of the optimum exploitation of the power. The braking device positively holds the control component, e.g. the toothed ring, of the gearing against rotation as long as the motor for the load balancing is not operating. However, the braking device is released by means of an automatic control when the motor is operated for the load balancing. The braking device is preferably arranged on the input side of the reduction gearing and the device is preferably hydraulically operated by means of the automatic control. A simple disc brake can advantageously be used as the braking device.

In further development of the invention the reduction gearing is mounted for rotation in a gear housing and the housing is supported against rotation by at least one force or pressure-measuring device which, as known, can include a stain-gauge sensor. In the case of a bi-directional motor, the associated reduction gearing is supported in both directions of rotation by a pair of these measuring devices. The association of the measuring device or devices with the rotatably mounted reduction gearing is such that the transmitted drive torque is measured, by way of the reactive force on the reduction gearing. This leads to constructional simplification and also has the advantage that the measuring device or devices is or are easily accessible from the exterior. The measuring device or devices in known manner have the effect that in the case of overload the overload clutch is released so that the output is decoupled from the drive input.

In detail the arrangement can advantageously be made such that the reduction gearing housing is arranged in a stationary outer housing and is held against rotation in relation to this housing by the measuring device o devices. The reduction gearing housing can be mounted in plain bearings of the outer housing. A bearing ring, which is provided with an added projection for abutting on the measuring device or devices can be connected to the housing of the reduction gearing.

It is further advisable to arrange on the input side of the reduction gearing an additional centrifugal brake which, on failure of the braking device or its controls prevents the associated motor from being driven, from the main drive through the reduction gearing with an unacceptably high rotation rate which could lead to its damage or destruction. The centrifugal brake is expediently arranged in a bearing piece attached on the input side to the housing of the reduction gearing.

The invention may be understood more readily and various other aspects and features of the invention may become apparent from consideration of the following description.

BRIEF DESCRIPTION OF DRAWINGS

An embodiment of the invention will now be described, by way of example only, with reference to the accompanying drawings wherein:

FIG. 3 is a part sectional end view of the unit shown in FIG. 2, the view being taken generally along the line III—III of FIG. 2.

DESCRIPTION OF PREFERRED EMBODIMENT

For a better understanding of the invention reference can also be made to U.S. Pat. No. 4,939,949 assigned to the same assignee as this application (the content of which is herein incorporated by such reference) as describing a drive system with overload protection and load-balancing characteristics and to U.S. Pat. Nos. 4,601,218 and 4,614,134 also assigned to the same assignee as this application (the contents of which are herein incorporated by such references) which describe overload protection arrangements.

Figure 1:
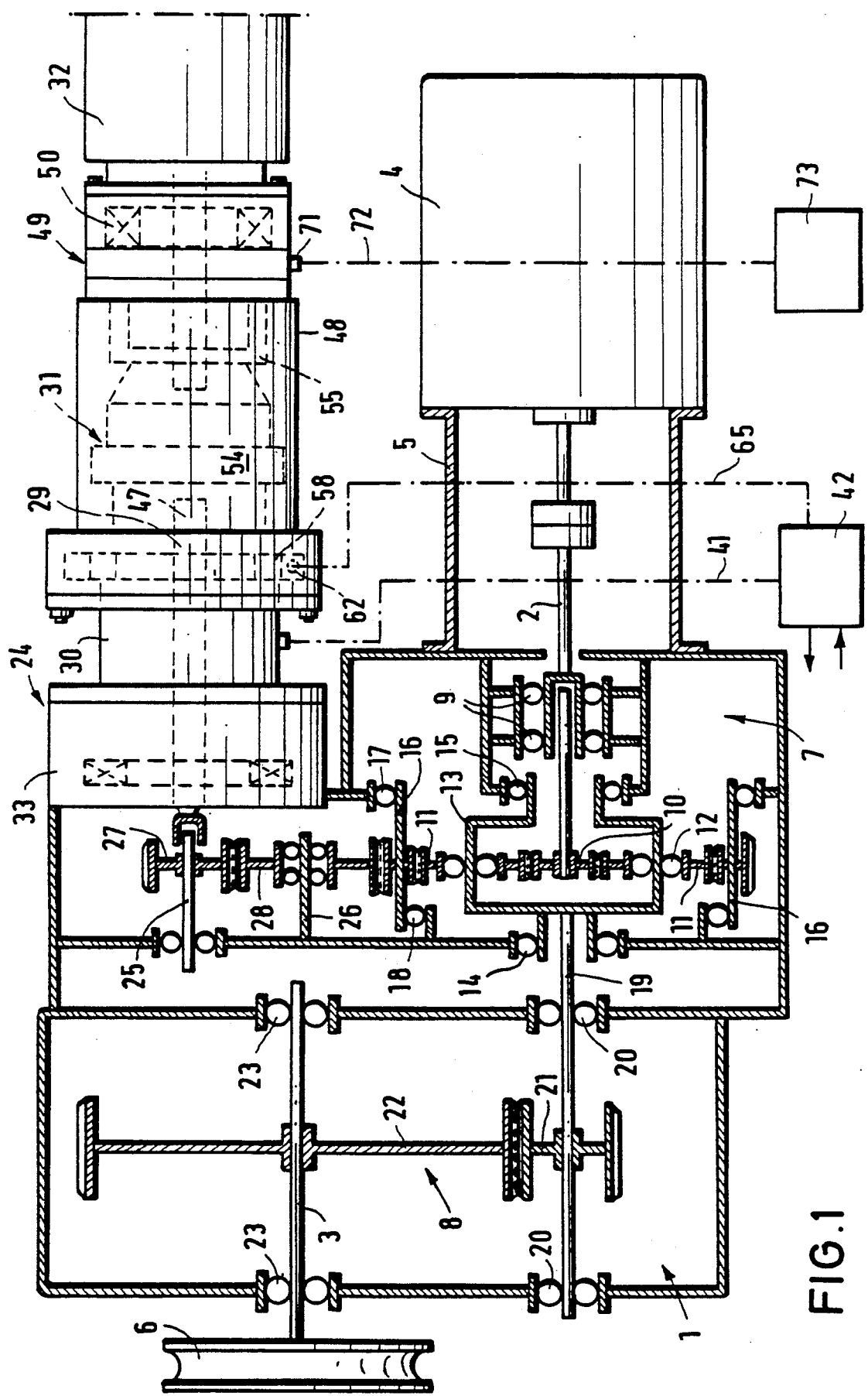
FIG. 1 is a diagrammatic sectional representation of a drive system constructed in accordance with the invention.

The drive system constructed in accordance with the invention and represented in FIG. 1 is composed of a gearing arrangement 1 forming the main gearing and superposition gearing between a drive input shaft 2 and a drive output shaft 3. The shaft 2 is driven by an asynchronous electric motor 4 which has its housing connected to a flange of a hollow member 5 within which the drive shaft 2 is coupled to the output shaft of the motor 4. Another flange of the member 5 is connected to a housing of the gearing arrangement 1. A chain wheel 6 is supported on the shaft 3 and an endless chain (not shown) is entrained around the wheel 6 and serves to propel a mining machine. A similar arrangement to that described and illustrated can be installed at the other end of the chain to form main and auxiliary drive stations as is known.

The gearing arrangement 1 has planetary gearing 7 forming an input stage and spur gearing 8 forming an output stage. The planetary gearing 7 has a sun wheel 10 carried on the input shaft 2 which is rotatably supported with bearings 9 and planet wheels 11 which mesh with the sun wheel 10. The planet wheels 11 are rotatably supported with bearings 12 on a common carrier 13 which in turn is rotatably supported by bearings 14, 15 in the housing for the gearing. The planet wheels 11 also mesh with an internally-toothed hollow wheel or ring 16 rotatably supported by bearings 17, 18 in the housing. The ring 16 forms a component for controlling the drive to effect load balancing in a manner known per se. The carrier 13 is coupled via a shaft 19 to the spur gearing 8. More particularly the shaft 19 is rotatably supported by bearings 20 in the housing and a spur gear 21 is mounted on the shaft 19 for rotation therewith. The spur gear 21 meshes with a larger spur gear 22 mounted on the output shaft 3 which is rotatably supported by bearings 23 in the housing.

The housing for the gearing 1 is best constructed from two sub-housings one containing the planetary gearing 7 and the other the spur gearing 8. It is possible to employ additional gearing stages and to replace the spur gearing 8 with another planetary gearing stage.

When the ring 16 is stationary the drive is transmitted from the shaft 2 through the planetary gearing 7 and the shaft 19 and the spur gearing 8 to the shaft 3 with a set transmission ratio. This ratio can be varied however by rotating the ring 16 at controlled speed to achieve load balancing.

The gearing arrangement as described is provided with overload protection and load balancing means. The overload protection function is provided by a clutch 24 to which an output shaft 25 rotatably supported by a bearing in the housing is coupled. On the shaft 25 there is a small gear wheel 27 which meshes with an intermediate gear wheel 28 rotatably supported by a bearing in the housing. The gear wheel 28 also meshes with external teeth of the ring 16 of the planetary gearing 7. The clutch 24 has an input shaft 29 extending through a hollow coupling member 30. The shaft 29 forms the output from reduction gearing 31 driven by a small electric motor 32 used for load balancing. The gearing 31, the coupling member 30 and the motor 32 are arranged in axial alignment parallel to the rotational axis of the motor 4 and have housings detachably secured with screws or the like.

The motor 32 is bi-directional to rotate the ring 16 in one direction or the other with a speed dependent on some parameter such as power consumption. When the motor 32 is operated and the clutch 24 drivably engaged, the ring 16 can be driven in one direction or the other via the gearing 31 and the gear wheels 27, 28 to effect load balancing in known manner. By controlling the speed and direction of rotation of the ring 16 by means of the motor 32 it is possible to regulate the output drive rotation of the wheel 6 so that the motor 4 is always maintained at optimum power.

Figure 2:
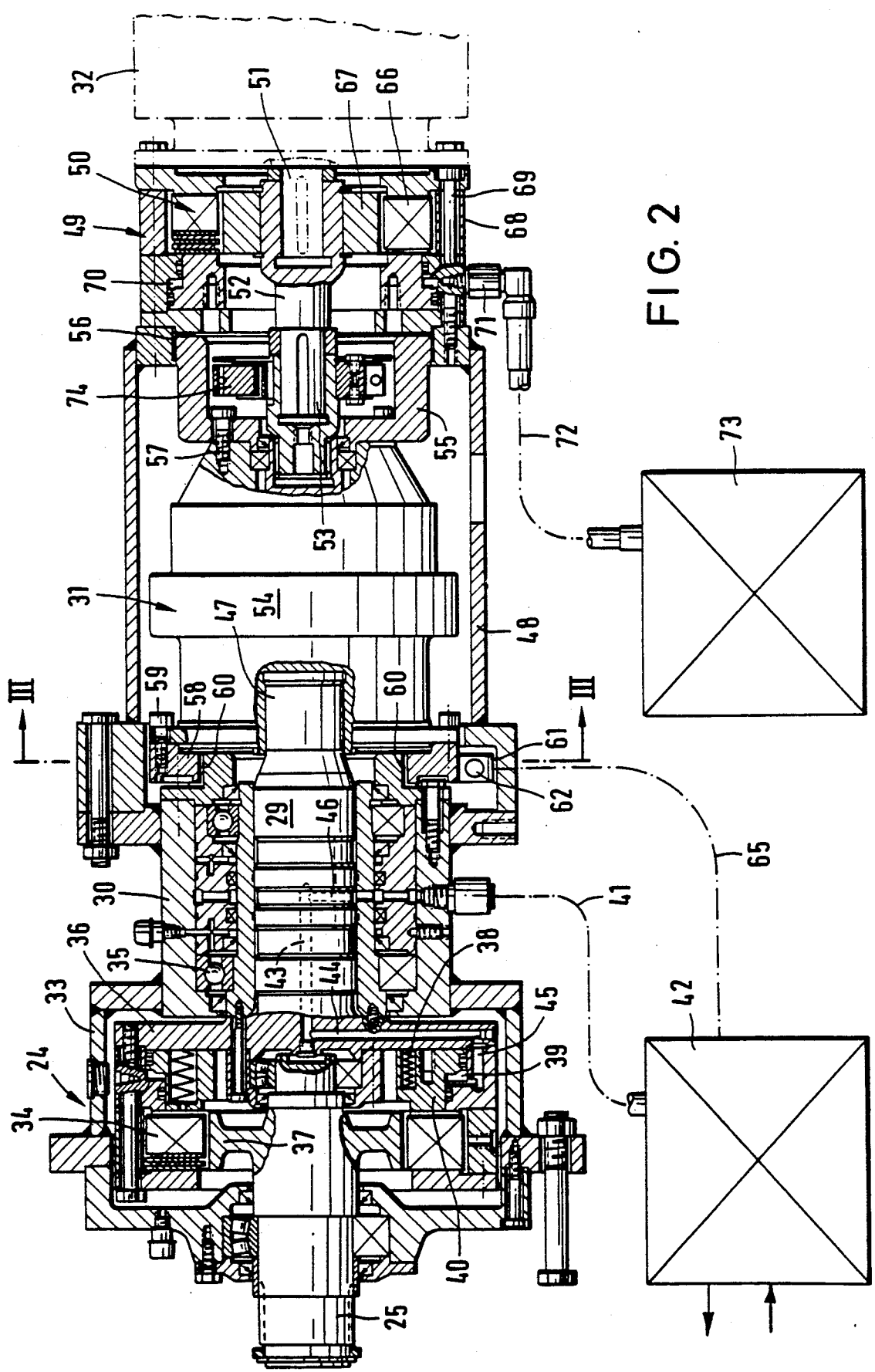
FIG. 2 is a sectional side view of part of the system depicted in FIG. 1.

Further details of the overload protection and load balancing means are depicted in FIGS. 2 and 3. The clutch 24 is constructed substantially as described in the aforementioned U.S. Pat. No. 4,601,218 as an electrohydraulically actuated device. The clutch 24 has multiple discs 34 in a housing 33. Some of the discs 34 are coupled to a part 36 rotationally locked to the input shaft 29 and the remainder of the discs 34 are coupled to a part 37 rotationally locked to the output shaft 25. The discs 34 are held together to drivably couple the parts 36, 37 together with the aid of springs 38 and hydraulic fluid is passed to a chamber 39 in the clutch housing 33 to overcome the force of the springs 38 and separate the discs 34 to disengage the parts 36, 37. The chamber 39 contains a pressure plate 40 which compresses the discs 34 together under the action of the springs 38 and the plate 40 acts as a piston when fluid is passed into the chamber 39. The chamber 39 is connected by way of a connector on the coupling piece 30 to a conduit 41 which leads to a control unit 42 provided with an electronic load valuation circuit. Hydraulic pressure and return lines are connected to the unit 42 which serves to connect one or other of these lines to the feed conduit 41. The shaft 29 extends through the coupling piece 30 and is supported for rotation therein with bearings 35.

The connector on the coupling piece 30 to which the conduit 41 is fitted leads via a packing and a system of passages and bores to the chamber 39 in known manner. More particularly, the shaft 29 is provided a radial pick-up bore 46 and an axial bore 43 which opens into a radial bore 44 of the clutch part 36 and is connected by way of a further axial bore 45 with the chamber 39.

The shaft 29 has a spigot 47 which fits into an output shaft of the reduction gearing 31. This gearing 31 has an external housing 48 fixed with screws or the like to the coupling piece 30 which is fixed to the housing 33 of the clutch 24.

The motor 32 has a housing connected with screws and abutting flanges to an intermediate housing 49 fixed to the housing 48. The housing 49 contains a braking device 50.

The motor 32 has an output shaft 51 connected through an intermediate shaft 52 to an input shaft 53 of the gearing 31. The rotational components of the assembly 32, 49, 48, 40, 33 are in axial alignment.

The gearing 31 has an inner housing 54 and a pot-shaped bearing component 55 mounted in a plain bearing 56 of the housing 48. The component 55 is fixed to the housing 54 with axial screws 47. An annular bearing component 58 is also detachably fixed to the housing 54 with screws 59 and the component 58 engages in a further plain bearing 60 at the end of the coupling piece 30. The bearing component 58 has an annular plate which has a radial projection 61 as shown in FIG. 3. Pins 62 which serve as force or pressure measuring devices engage on this part 61. Each pin 62 has a strain gauge sensor 63 and a threaded end cap 64 which screws into a threaded bore in the housing 48. Electrical leads 65 extend from the sensors 63 back to the control unit 42. The pins 62 hold the housing 54 of the gearing 31 in both rotational senses and sense the reactive forces which emanate from the ring 16 of the planetary gearing 7 and act via the gear wheels 27, 28. The forces pass from the ring 16 and the gear wheels 27, 28 through the engaged clutch 24 to the shaft 29 and thence to the gearing 31. The control unit 42 receives signals from the sensors 63 depending on the forces on the pins 62 and the electronic evaluation circuit is designed to operate an electro-magnetic valve in the event that the signals signify an overload. The valve opens to cause the supply of pressure fluid to the chamber 39 to disengage the clutch 24 and this permits the ring 16 to rotate freely thereby de-coupling the drive to the shaft 3.

When the clutch 24 is engaged and the motor 32 is not operative the ring 16 is held against rotation by the braking device 50 which is coupled-in via the shaft 52, the reduction gearing 31, the shafts 35, 25 and the gear wheels 27, 28. Reaction forces on the ring 16 are taken up by the braking device 50 and passed to the housing 49. The motor 32 is not subjected to any holding force.

The braking device 50 is constructed as a disc brake with a stack of discs 66 alternately fixed to a carrier 67 on the shaft 52 and to a ring 68 on the housing 49. The housing 49 is fixed with screws 69 to the housing 48. The braking device 50 is similar to the clutch 24 in that the discs 66 are compressed together to lock the shaft 52 to the housing 49 by means of springs and the discs 66 are separated by hydraulic pressure. The braking device 50 is thus provided with a chamber 70 which leads to a connector 71 and thence through a conduit 72 to a control unit 73. The unit 73 can be combined with the other control unit 42 for simplicity. The control unit 73 functions so that where the motor 32 is operative the chamber 7 is charged with pressure fluid to separate the discs 66 and release the braking device 50 and conversely when the motor 32 is inoperative the chamber 70 is relieved to permit the springs to compress the discs 66 and to lock the shaft 52 to the housing 49.

Between the motor 32 and the reduction gearing 31 there is a centrifugal braking device 74. This device 74 is located in the bearing component 55 and the shaft 53 rotatably coupled to the gearing 31. The device 74 can be of known construction and operates as a safely device. In the event of a failure of the braking device 50 or its controls the motor 32 is prevented from being driven in reverse by the ring 16 and the clutch 24 by the override brake 74.

It is notable that the components 24, 30, 31 50, 32 which serves as the overload protection and load balancing means are combined as a compact constructional unit easily connected to and disconnected from the main gearing 1.

Where the chain propels a coal plough, for example then as mentioned a drive system as described is preferably provided as main and auxiliary drive stations with the chain entrained around both wheels 6 of the drive systems. The motors 4 of the two drives would in general possesses the same rating and the overall control would effect load balancing. With the aid of the reduction gearings 31 the motors 32 can be finely regulated.

We claim:

1. In a drive system for propelling an endless traction member of a mineral mining installation and comprising an electric drive motor, gearing connecting the motor to an output for propelling the traction member, said gearing including at least one planetary gearing stage with a rotatable control component drivable to effect load balancing, overload protection and load balancing means composed of a clutch drivably connected to the component of the planetary gearing stage, a second electric motor for driving the component at controlled speed via the clutch and a control unit for disengaging the clutch in the event of overloading; the improvement comprising reduction gearing interconnecting the second motor and the clutch and a braking device in a drive connection between the second motor and the component for selectively locking the component.

2. A drive system according to claim 1 wherein the planetary gearing comprises a sun wheel drivably connected to the motor, planet wheels meshing with the sun wheel, a carrier rotatably supporting the planet wheels drivably connected to said output and a toothed ring meshing with the planet wheels, the toothed ring serves as said component.

3. A drive system according to claim 1 wherein there is provided control means for automatically disengaging the braking device when the second motor is operative.

4. A drive system according to claim 1 wherein the braking device is disposed at an input of the reduction gearing.

5. A drive system according to claim 1 wherein the braking device is actuated hydraulically to release the component.

6. A drive system according to claim 1 wherein the braking device is a friction brake.

7. A drive system according to claim 1, wherein the braking device is a multi-disc friction brake within a housing and the discs are compressed to lock a drive shaft to the housing.

8. A drive system according to claim 1, wherein the reduction gearing is contained in a housing supported for rotation and the housing is held against rotation by at least one force measuring device.

9. A drive system according to claim 8 wherein the force measuring device is a pin provided with a strain gauge sensor.

10. A drive system according to claim 8 wherein the housing for the reduction gearing is disposed within another housing.

11. A drive system according to claim 10, wherein the housing for the reduction gearing is mounted with plain bearings for rotation in the other housing.

12. A drive system according to claim 8, wherein the second motor is bi-directional and the housing for the reduction gearing is held by a pair of force measuring devices.

13. A drive system according to claim 8, wherein a component with a projection engaged with the force measuring device is secured to the housing of the reduction gearing.

14. A drive system according to claim 1 and further comprising a centrifugal brake at an output of the reduction gearing.

15. A drive system according to claim 8 and further comprising a centrifugal brake located in a bearing component attached to the housing of the reduction gearing.

16. A drive system according to claim 1 wherein the clutch, the braking device, the second motor and the reduction gearing are installed in axial alignment with respective housings detachably connected to one another to form a constructional unit.

17. A drive system according to claim 1 wherein the clutch is connected to the component through a load-balancing gear wheel connected to a shaft of the clutch and another gear wheel meshing with the component and the load-balancing gear wheel.

* * * * *